US007392212B2

(12) United States Patent
Hancock et al.

(10) Patent No.: US 7,392,212 B2
(45) Date of Patent: Jun. 24, 2008

(54) USER-INTERACTIVE FINANCIAL VEHICLE PERFORMANCE PREDICTION, TRADING AND TRAINING SYSTEM AND METHODS

(75) Inventors: Peter Hancock, Rye, NY (US); Jeffrey Saltz, Ridgewood, NJ (US); Andrew Abrahams, New York, NY (US); Sanay Hikmet, Ossining, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 1257 days.

(21) Appl. No.: 09/961,883

(22) Filed: Sep. 24, 2001

(65) Prior Publication Data

US 2002/0107784 A1  Aug. 8, 2002

Related U.S. Application Data

(60) Provisional application No. 60/236,259, filed on Sep. 28, 2000.

(51) Int. Cl.
*G06Q 40/00* (2006.01)
(52) U.S. Cl. .............................. 705/36; 705/35; 705/37
(58) Field of Classification Search .................. 705/35, 705/36, 37, 39–45
See application file for complete search history.

(56) References Cited

U.S. PATENT DOCUMENTS

| 4,169,285 | A | 9/1979 | Walker |
|---|---|---|---|
| 4,648,038 | A | 3/1987 | Roberts et al. |
| 4,739,478 | A | 4/1988 | Roberts et al. |
| 4,742,457 | A | 5/1988 | Leon et al. |
| 4,752,877 | A | 6/1988 | Roberts et al. |
| 4,933,842 | A | 6/1990 | Durbin et al. |
| 5,121,469 | A | 6/1992 | Richards et al. |

(Continued)

FOREIGN PATENT DOCUMENTS

EP   WO 01/31528 A1   5/2001

(Continued)

OTHER PUBLICATIONS

PCT International Search Report dated Aug. 29, 2002.

(Continued)

*Primary Examiner*—Nga Nguyen (74) *Attorney, Agent, or Firm*—Hunton & Williams LLP (57) ABSTRACT

Methods and system for allowing a user, through a computer in telecommunication link with a system having access to financial and market data, to predict the performance of a financial vehicle and thereby provide training for trading options or evaluating predictions are provided. One method includes providing a user interface, via the computer, which allows the user to specify a financial vehicle; displaying, via the user interface, historical performance data for the financial vehicle specified by the user; displaying, via the user interface, projected performance data for the financial vehicle; receiving from the user, via the user interface, performance prediction for the financial vehicle for a time period; receiving from the user, via the user interface, amount of money to leverage relating to the performance prediction for the financial vehicle for the time period; storing the performance prediction for the financial vehicle and the amount of money leveraged; calculating payoff amount based on the performance prediction for the financial vehicle and the amount of money leveraged; and displaying, via the user interface, the calculated payoff amount.

33 Claims, 3 Drawing Sheets

U.S. PATENT DOCUMENTS

| | | | |
|---|---|---|---|
| 5,222,019 A | 6/1993 | Yoshino et al. |
| 5,257,369 A | 10/1993 | Skeen et al. |
| 5,270,922 A | 12/1993 | Higgins |
| 5,297,032 A | 3/1994 | Trojan et al. |
| 5,305,200 A | 4/1994 | Hartheimer et al. |
| 5,419,890 A | 5/1995 | Saidi |
| 5,454,104 A | 9/1995 | Steidlmayer et al. |
| 5,462,438 A | 10/1995 | Becker et al. |
| 5,497,317 A | 3/1996 | Hawkins et al. |
| 5,517,406 A | 5/1996 | Harris et al. |
| 5,557,798 A | 9/1996 | Skeen et al. |
| 5,563,783 A | 10/1996 | Stolfo et al. |
| 5,592,379 A | 1/1997 | Finfrock et al. |
| 5,649,186 A | 7/1997 | Ferguson |
| 5,675,746 A | 10/1997 | Marshall |
| 5,692,233 A * | 11/1997 | Garman .................. 705/36 R |
| 5,706,502 A | 1/1998 | Foley et al. |
| 5,710,889 A | 1/1998 | Clark et al. |
| 5,724,593 A | 3/1998 | Hargrave, III et al. |
| 5,778,157 A | 7/1998 | Oatman et al. |
| 5,787,402 A | 7/1998 | Potter et al. |
| 5,802,499 A | 9/1998 | Sampson et al. |
| 5,806,047 A | 9/1998 | Hackel et al. |
| 5,806,048 A | 9/1998 | Kiron et al. |
| 5,812,988 A | 9/1998 | Sandretto |
| 5,819,237 A | 10/1998 | Garman |
| 5,819,238 A | 10/1998 | Fernholz |
| 5,819,273 A | 10/1998 | Vora et al. |
| 5,832,461 A | 11/1998 | Leon et al. |
| 5,845,265 A | 12/1998 | Woolston |
| 5,845,266 A | 12/1998 | Lupien et al. |
| 5,852,811 A | 12/1998 | Atkins |
| 5,864,827 A | 1/1999 | Wilson |
| 5,884,286 A | 3/1999 | Daughtery, III |
| 5,890,140 A | 3/1999 | Clark et al. |
| 5,893,078 A | 4/1999 | Paulson |
| 5,913,202 A | 6/1999 | Motoyama |
| 5,913,214 A | 6/1999 | Madnick et al. |
| 5,918,217 A | 6/1999 | Maggioncalda et al. |
| 5,918,218 A | 6/1999 | Harris et al. |
| 5,922,044 A | 7/1999 | Banthia |
| 5,926,800 A | 7/1999 | Baronowski et al. |
| 5,940,810 A | 8/1999 | Traub et al. |
| 5,944,784 A | 8/1999 | Simonoff et al. |
| 5,946,667 A | 8/1999 | Tull, Jr. et al. |
| 5,950,175 A | 9/1999 | Austin |
| 5,950,176 A | 9/1999 | Keiser et al. |
| 5,950,177 A | 9/1999 | Lupien et al. |
| 5,963,923 A | 10/1999 | Garber |
| 5,966,531 A | 10/1999 | Skeen et al. |
| 5,966,672 A | 10/1999 | Knupp |
| 5,970,479 A | 10/1999 | Shepherd |
| 5,978,780 A | 11/1999 | Watson |
| 5,986,673 A | 11/1999 | Martz |
| 5,987,435 A | 11/1999 | Weiss et al. |
| 5,995,943 A | 11/1999 | Bull et al. |
| 6,006,206 A | 12/1999 | Smith et al. |
| 6,012,042 A | 1/2000 | Black et al. |
| 6,012,046 A | 1/2000 | Lupien et al. |
| 6,016,483 A | 1/2000 | Rickard et al. |
| 6,018,714 A | 1/2000 | Risen, Jr. |
| 6,018,721 A | 1/2000 | Aziz et al. |
| 6,018,722 A | 1/2000 | Ray et al. |
| 6,021,397 A | 2/2000 | Jones et al. |
| 6,021,398 A | 2/2000 | Ausubel |
| 6,023,280 A | 2/2000 | Becker et al. |
| 6,026,381 A | 2/2000 | Barton, III et al. |
| 6,026,383 A | 2/2000 | Ausubel |
| 6,029,146 A | 2/2000 | Hawkins et al. |
| 6,029,147 A | 2/2000 | Horadan et al. |
| 6,035,287 A | 3/2000 | Stallaert et al. |
| 6,049,783 A | 4/2000 | Segal et al. |
| 6,052,673 A | 4/2000 | Leon et al. |
| 6,055,522 A | 4/2000 | Krishna et al. |
| 6,058,378 A | 5/2000 | Clark et al. |
| 6,058,379 A | 5/2000 | Odom et al. |
| 6,061,662 A * | 5/2000 | Makivic .................. 705/36 R |
| 6,064,984 A | 5/2000 | Ferguson et al. |
| 6,073,104 A | 6/2000 | Field |
| 6,073,115 A | 6/2000 | Marshall |
| 6,076,072 A | 6/2000 | Libman |
| 6,078,903 A | 6/2000 | Kealhofer |
| 6,078,904 A | 6/2000 | Rebane |
| 6,078,914 A | 6/2000 | Redfern |
| 6,078,956 A | 6/2000 | Bryant et al. |
| 6,081,774 A | 6/2000 | de Hita et al. |
| 6,085,176 A | 7/2000 | Woolston |
| 6,088,685 A | 7/2000 | Kiron et al. |
| 6,092,056 A | 7/2000 | Tull, Jr. et al. |
| 6,098,051 A | 8/2000 | Lupien et al. |
| 6,105,005 A | 8/2000 | Fuhrer |
| 6,131,082 A | 10/2000 | Hargrave, III et al. |
| 6,134,600 A | 10/2000 | Liu |
| 6,148,298 A | 11/2000 | LaStrange et al. |
| 6,173,270 B1 | 1/2001 | Cristofich et al. |
| 6,173,276 B1 | 1/2001 | Kant et al. |
| 6,178,420 B1 | 1/2001 | Sassano |
| 6,185,567 B1 | 2/2001 | Ratnaraj et al. |
| 6,195,647 B1 | 2/2001 | Martyn et al. |
| 6,226,623 B1 | 5/2001 | Schein et al. |
| 6,233,566 B1 | 5/2001 | Levine et al. |
| 6,236,972 B1 | 5/2001 | Shkedy |
| 6,236,977 B1 | 5/2001 | Verba et al. |
| 6,236,980 B1 * | 5/2001 | Reese ..................... 705/36 R |
| 6,243,670 B1 | 6/2001 | Bessho et al. |
| 6,249,770 B1 | 6/2001 | Erwin et al. |
| 6,260,021 B1 | 7/2001 | Wong et al. |
| 6,263,321 B1 | 7/2001 | Daughtery, III |
| 6,263,335 B1 | 7/2001 | Paik et al. |
| 6,266,683 B1 | 7/2001 | Yehuda et al. |
| 6,272,474 B1 | 8/2001 | Garcia |
| 6,275,229 B1 | 8/2001 | Weiner et al. |
| 6,278,982 B1 | 8/2001 | Korhammer et al. |
| 6,282,537 B1 | 8/2001 | Madnick et al. |
| 6,285,986 B1 | 9/2001 | Andrews |
| 6,285,989 B1 | 9/2001 | Shoham |
| 6,304,858 B1 | 10/2001 | Mosler et al. |
| 6,313,854 B1 | 11/2001 | Gibson |
| 6,317,726 B1 | 11/2001 | O'Shaughnessy |
| 6,317,728 B1 | 11/2001 | Kane |
| 6,321,212 B1 | 11/2001 | Lange |
| 6,323,881 B1 | 11/2001 | Broulik et al. |
| 6,332,163 B1 | 12/2001 | Bowman-Amuah |
| 6,338,055 B1 | 1/2002 | Hagmann et al. |
| 6,338,068 B1 | 1/2002 | Moore et al. |
| 6,343,287 B1 | 1/2002 | Kumar et al. |
| 6,347,307 B1 | 2/2002 | Sandhu et al. |
| 6,349,291 B1 | 2/2002 | Varma |
| 6,356,933 B2 | 3/2002 | Mitchell et al. |
| 6,360,210 B1 | 3/2002 | Wallman |
| 6,366,908 B1 | 4/2002 | Chong et al. |
| 6,381,585 B1 | 4/2002 | Maples et al. |
| 6,381,586 B1 | 4/2002 | Glasserman et al. |
| 6,385,660 B2 | 5/2002 | Griesemer et al. |
| 6,389,413 B2 | 5/2002 | Takahashi et al. |
| 6,389,452 B1 | 5/2002 | Glass |
| 6,401,080 B1 | 6/2002 | Bigus et al. |
| 6,408,282 B1 | 6/2002 | Buist |
| 6,418,417 B1 | 7/2002 | Corby et al. |
| 6,421,653 B1 | 7/2002 | May |
| 6,424,980 B1 | 7/2002 | Iizuka et al. |
| 6,429,868 B1 | 8/2002 | Dehner, Jr. et al. |
| 6,442,545 B1 | 8/2002 | Feldman et al. |
| 6,446,110 B1 | 9/2002 | Lection et al. |

| | | | | | | |
|---|---|---|---|---|---|---|
| 6,453,303 B1 * | 9/2002 | Li .................... 705/36 R | 2002/0152154 A1 | 10/2002 | Rothman et al. |
| 6,457,066 B1 | 9/2002 | Mein et al. | 2002/0152156 A1 | 10/2002 | Tyson-Quah |
| 6,460,021 B1 | 10/2002 | Kirksey | 2002/0156658 A1 | 10/2002 | Selesny et al. |
| 6,480,882 B1 | 11/2002 | McAdam et al. | 2002/0161692 A1 | 10/2002 | Loh et al. |
| 6,489,954 B1 | 12/2002 | Powlette | 2002/0161853 A1 | 10/2002 | Burak et al. |
| 6,490,584 B2 | 12/2002 | Barrett et al. | 2002/0169707 A1 | 11/2002 | Koek et al. |
| 6,493,681 B1 | 12/2002 | Tertitski et al. | 2002/0174043 A1 | 11/2002 | Gilbert et al. |
| 6,510,406 B1 | 1/2003 | Marchisio | 2002/0178096 A1 | 11/2002 | Marshall |
| 6,516,303 B1 | 2/2003 | Wallman | 2002/0184132 A1 | 12/2002 | Foster |
| 6,516,308 B1 | 2/2003 | Cohen | 2002/0184237 A1 | 12/2002 | McFeely |
| 6,523,022 B1 | 2/2003 | Hobbs | 2002/0194097 A1 | 12/2002 | Reitz |
| 6,556,987 B1 | 4/2003 | Brown et al. | 2002/0194114 A1 | 12/2002 | Erdmier |
| 6,564,191 B1 * | 5/2003 | Reddy .................... 705/36 R | 2003/0004942 A1 | 1/2003 | Bird |
| 6,564,250 B1 | 5/2003 | Nguyen | 2003/0009411 A1 | 1/2003 | Ram et al. |
| 6,581,056 B1 | 6/2003 | Rao | 2003/0018558 A1 | 1/2003 | Heffner et al. |
| 6,581,062 B1 | 6/2003 | Draper et al. | 2003/0018714 A1 | 1/2003 | Mikhailov et al. |
| 6,598,028 B1 | 7/2003 | Sullivan et al. | 2003/0033212 A1 | 2/2003 | Sandhu et al. |
| 6,601,044 B1 | 7/2003 | Wallman | 2003/0037174 A1 | 2/2003 | Lavin et al. |
| 6,606,615 B1 * | 8/2003 | Jennings et al. ............ 706/45 | 2003/0065594 A1 | 4/2003 | Murphy |
| 6,611,825 B1 | 8/2003 | Billheimer et al. | 2003/0066025 A1 | 4/2003 | Garner et al. |
| 6,615,187 B1 | 9/2003 | Ashenmil et al. | 2003/0066032 A1 | 4/2003 | Ramachandran et al. |
| 6,629,097 B1 | 9/2003 | Keith | 2003/0078869 A1 | 4/2003 | Williams |
| 6,631,373 B1 | 10/2003 | Otani et al. | 2003/0088496 A1 | 5/2003 | Piotrowski |
| 6,633,868 B1 | 10/2003 | Min et al. | 2003/0093360 A1 | 5/2003 | May |
| 2001/0011241 A1 | 8/2001 | Nemzow | 2003/0093362 A1 | 5/2003 | Tupper et al. |
| 2001/0011242 A1 | 8/2001 | Allex et al. | 2003/0093565 A1 | 5/2003 | Berger et al. |
| 2001/0018674 A1 | 8/2001 | Schein et al. | 2003/0105981 A1 | 6/2003 | Miller et al. |
| 2001/0025264 A1 | 9/2001 | Deaddio et al. | 2003/0115122 A1 | 6/2003 | Slater et al. |
| 2001/0032217 A1 | 10/2001 | Huang | 2003/0126063 A1 | 7/2003 | Reuter |
| 2001/0037284 A1 | 11/2001 | Finkelstein et al. | 2003/0126068 A1 | 7/2003 | Hauk et al. |
| 2001/0042034 A1 | 11/2001 | Elliott | 2003/0126069 A1 | 7/2003 | Cha |
| 2001/0043235 A1 | 11/2001 | Best et al. | 2003/0126117 A1 | 7/2003 | Megiddo et al. |
| 2001/0044771 A1 | 11/2001 | Usher et al. | 2003/0140035 A1 | 7/2003 | Burrows |
| 2001/0056392 A1 | 12/2001 | Daughtery, III | 2003/0149653 A1 | 8/2003 | Penney |
| 2001/0056398 A1 | 12/2001 | Scheirer | 2003/0154071 A1 | 8/2003 | Shreve |
| 2002/0002530 A1 | 1/2002 | May | 2003/0158949 A1 | 8/2003 | Miller et al. |
| 2002/0004774 A1 | 1/2002 | Defario | 2003/0188255 A1 | 10/2003 | Shimizu et al. |
| 2002/0004777 A1 | 1/2002 | Foster et al. | 2003/0220861 A1 | 11/2003 | Broms et al. |
| 2002/0007335 A1 | 1/2002 | Millard et al. | 2003/0220868 A1 | 11/2003 | May |
| 2002/0007358 A1 | 1/2002 | Johnson et al. | 2003/0233459 A1 | 12/2003 | Miller et al. |
| 2002/0013753 A1 | 1/2002 | Marks de Chabris et al. | 2003/0236862 A1 | 12/2003 | Miller et al. |
| 2002/0013862 A1 | 1/2002 | Orchard et al. | 2003/0236957 A1 | 12/2003 | Miller et al. |
| 2002/0016762 A1 | 2/2002 | Feilbogen et al. | 2004/0064397 A1 | 4/2004 | Lynn et al. |
| 2002/0016819 A1 | 2/2002 | Sugimoto et al. | 2004/0078248 A1 | 4/2004 | Altschuler |
| 2002/0018077 A1 | 2/2002 | Powlette | 2004/0103003 A1 | 5/2004 | Mayers et al. |
| 2002/0022956 A1 | 2/2002 | Ukranincsky et al. | 2004/0148247 A1 | 7/2004 | Miller et al. |
| 2002/0023053 A1 | 2/2002 | Szoc et al. | 2004/0162775 A1 | 8/2004 | Winklevoss et al. |
| 2002/0026405 A1 | 2/2002 | Haar | 2004/0167850 A1 | 8/2004 | Dreyer et al. |
| 2002/0026449 A1 | 2/2002 | Azenoctt | 2004/0220885 A1 | 11/2004 | Salzmann et al. |
| 2002/0026462 A1 | 2/2002 | Shotton, Jr. et al. | 2004/0225596 A1 | 11/2004 | Kemper et al. |
| 2002/0029183 A1 | 3/2002 | Vlahoplus et al. | 2005/0060256 A1 | 3/2005 | Peterson et al. |
| 2002/0032644 A1 | 3/2002 | Corby et al. | 2005/0086170 A1 | 4/2005 | Rao |
| 2002/0035561 A1 | 3/2002 | Archer et al. | | | |
| 2002/0042767 A1 | 4/2002 | Kwan | | | |
| 2002/0049666 A1 | 4/2002 | Reuter et al. | | FOREIGN PATENT DOCUMENTS | |
| 2002/0054115 A1 | 5/2002 | Mack et al. | | | |
| 2002/0059141 A1 | 5/2002 | Davies et al. | JP | 406139227 A | 5/1994 |
| 2002/0065752 A1 | 5/2002 | Lewis | WO | WO 98/43170 | 10/1998 |
| 2002/0065755 A1 | 5/2002 | Shlafman et al. | WO | WO 01/20530 | 3/2001 |
| 2002/0069157 A1 | 6/2002 | Jordan | WO | WO 01/37540 | 5/2001 |
| 2002/0073007 A1 | 6/2002 | Ayache | WO | WO 01/57716 | 8/2001 |
| 2002/0078253 A1 | 6/2002 | Szondy et al. | WO | WO 01/59670 | 8/2001 |
| 2002/0087373 A1 | 7/2002 | Dickstein et al. | WO | WO 02/03774 | 1/2002 |
| 2002/0087454 A1 | 7/2002 | Calo et al. | WO | WO 02/14991 | 2/2002 |
| 2002/0087455 A1 | 7/2002 | Tsagarakis et al. | WO | WO 02/054189 | 7/2002 |
| 2002/0087457 A1 | 7/2002 | Madeley et al. | WO | WO 02/056146 | 7/2002 |
| 2002/0099646 A1 | 7/2002 | Agarwal et al. | WO | WO 02/063516 | 8/2002 |
| 2002/0099656 A1 | 7/2002 | Poh Wong | WO | WO 02/065278 | 8/2002 |
| 2002/0112056 A1 | 8/2002 | Baldwin et al. | WO | WO 02/065286 | 8/2002 |
| 2002/0123947 A1 | 9/2002 | Yuste et al. | WO | WO 03/012588 | 2/2003 |
| 2002/0130868 A1 | 9/2002 | Smith | WO | WO 03/030013 | 4/2003 |
| 2002/0138390 A1 | 9/2002 | May | WO | WO 03/032158 | 4/2003 |
| 2002/0147671 A1 | 10/2002 | Sloan et al. | | | |

| WO | WO 03/065256 | 8/2003 |
| WO | WO 03/102733 | 12/2003 |

OTHER PUBLICATIONS

Manco et al., A Framework For Adaptive Mail Classification, 14th IEEE Conference on Tools with Artificial Intelligence (ICT AI'02), Nov. 4, 2002, p. 387.

Silverman, A new strategy for giving away your money, Wall Street Journal, D1, Oct. 6, 2004.

Czejdo, Automatic generation ontology based anntations in XML and their use in retrieval systems, Web Information Systems Engineering, 2000, Proceedings of the First International Conference, Jun. 19, 2000, p. 296.

Novell, Inc., Beginning of Viewing Information and Viewing Basic Information about a print job.

Block Trades Market Practice, Apr. 1, 2003, pp. 1-10.

Chacko, Cephalon, Inc. Taking Risk Management Gherory Seriously.

Kus, Contingent capital: just in the capital management sets a new standard; Sponsored statement.

Electronic Trading Tools.

Martin, Email Report, Issue 11, Aug. 16, 2001, printed Aug. 16, 2001, printed Aug. 2, 2005.

Fast Email Extractor 4.1

Form 10-K, United States Securities and Exchange Commission, no date,year ending Dec. 31, 2003.

PILA, In Case Of Emergency, contingent capital.

Intellseek and Inxight Partner to Provide New Business Intelligence Solutions, www.inxight.com/news/021029_intelliseek.html, Oct. 29, 2002.

Unknown, Investigating Systems.

May, Modeling and Querying Structure and Contents of the Web, 10th International Workshop on Database & Amp; Expert Systems Applications, Sep. 1, 1999, p. 721.

Rupali et al., Phrase-based Text Representation for Managing the Web Documents.

Lam et al., Querying Web Data—The WebQA Approach.

Rising to the challenge of global STP, Euromoney Publications PLC Global Inventor, Nov. 1, 1999, pp. 51-52; Issn. 0951-3604.

STP in the Bond Market?, Wall Street & Technology, Dec. 1, 2002, p. 20.

Ericson, Softwerc releases patent-pending.

IBM Corp., Strict Read Order Control for a Queing System.

Carchiolo et al., Structuring the Web.

Witten et al., Text Mining: A New Frontier for Lossless Compression.

Fan et al., The Internet and Future Financial Markets; Industry Trend or Event, Association for Computing Machinery, Inc., Sec. 11, vol. 43; Nov. 1, 2000, p. 82; Issn: 0001-0782.

Emery, et al., The Measurement of Liquidity, Journal of Accounting Research, vol. 20, No. 2, Part 1, p. 290-303, Autumn 1982.

Calado, The Web-DL Environment for Building Digital Libraries from the Web.

Ribiero-Neto et al., Top Down Extraction of Semi-Structured Data, String Processing and Information Retrieval Symposium & amp.

Roberts, Top Priority on Bottom Line: More Companies Seeting to Manage Business Risks.

TradeWeb's STP vision, Euromoney Institutional Investor PLC, Sec. 406, vol. 34, Feb. 1, 2003, p. S6; Issn: 0014-2433.

Elkayam, Using Indexed Bonds.

Myllymaki, With Standard XML Technologies.

Hewlett-Packard, x4queview.org.

Grant Lukenbill, "DraftWorldwide Adds 3 Dot-Coms", iMarketing News, vol. 2, No. 18, p. 18.

Edward J. Kane, "Market Incompleteness and Divergences Between Forward and Futures Interest Rates", The Journal of Finance, vol. 35, No. 2, Papers and Proceedings Thirty-Eighth Annual Meeting American Finance Association, Atlanta, Georgia, Dec. 28-30, 1979, p. 221-234.

Michael Hernan, "Simple vs. Compound Interest a Wide Gap; [Third Edition]", The Morning Call, Allentown, PA, Dec. 6, 1992, p. D.01.

* cited by examiner

USER-INTERACTIVE FINANCIAL VEHICLE PERFORMANCE PREDICTION, TRADING AND TRAINING SYSTEM AND METHODS

RELATED U.S. APPLICATION DATA

This non-provisional application claims priority from a provisional application, Ser. No. 60/236,259, filed on Sep. 28, 2000, which is incorporated herein by reference.

BACKGROUND OF THE INVENTION

Along with the surging popularity of the Internet, there has been a corresponding surge in the usage of the Internet by individuals for online investment education, research and transactions. As noted in the popular media, millions of individuals, via the Internet, conduct online investment transactions, most of which involve buying and selling of stocks. According to the Wall Street Journal, for example, 3.7 million U.S. households conducted at least one online investment transaction for the six months ended February, 2001, which was actually an 18% decrease from the 4.5 million U.S. households which conducted at least one online investment transaction for the six months ended August, 2000. *"Online Traders Disappear, But Perhaps Not For Good"*, The Wall Street Journal, Mar. 28, 2001.

While online stock trading has proliferated, online options transactions have only increased incrementally. The primary reason for this appears to be a lack of understanding among investors about what options are and how they can become a meaningful part of one's investment strategy.

In broad terms, options allow an investor with a hunch about the direction of a security's price to try to profit from that hunch without having to lay out the full amount it would cost to purchase the security. For example, a call option gives its holder the right but not the obligation to purchase a security (e.g., stock) at a preselected price (i.e., the "strike price") by a preselected date. An investor typically buys a call option if he believes that the value of the security will increase by the preselected date. By contrast, a put option gives its holder the right but not the obligation to sell a security at a preselected price by a preselected date. An investor typically buys a put option if he believes that the value of the security will decrease by the preselected date.

A call option is "in the money" when the strike price is below the price of the security. For example, a call option with a strike price of $50 per share for XYZ Company's stock is in the money when XYZ Company's stock price is trading at $58 per share. A put option is "in the money" when the strike price is above the price of the security. For example, a put option with a strike price of $56 per share for XYZ Company's stock is in the money when XYZ Company's stock price is trading at $49 per share.

Generally, a binary option, also known as all-or-nothing option, bet option, digital option or lottery option, is a European option with a fixed, predetermined payoff if the underlying instrument or index is at or beyond the strike price at expiration. The value of the payoff is not affected by the magnitude of the difference between the underlying instrument or index and the strike price. The strike price is the price at which the options contract stipulates the underlying instrument or index will be bought or sold. A European style option is one which can only be exercised on its expiration date. By contrast, an American style option is an option which the holder may exercise any time up to and including the option's expiration date.

There are two types of binary options, a cash-or-nothing and asset-or-nothing options. A holder of a cash-or-nothing binary option receives a fixed payoff if the option expires in the money or nothing if the option expires out of the money. A holder of an asset-or-nothing binary option receives the underlying asset if the option expires in the money or nothing if the option expires out of the money.

A range accumulation option or warrant is a series of binary options with each option covering a short period. The payoff of the range accumulation option is the sum of the payoffs of the component binary options. The component options, in turn, payoff when the underlying price or rate falls within a designated range. Range accumulation options may be stand-alone instruments, but they are frequently embedded in notes to create Index Range Notes or LIBOR Range Notes.

An Index Range Note is a note with a coupon determined largely or entirely by an embedded range accumulation option. Equity indexes, currency exchange rates and interest rates are among the underlying indexes, prices or rates that can determine the payoff. LIBOR (i.e., London Inter-Bank Offered Rate) Range Notes are the most common variety of Index Range Notes.

As the above descriptions relating to options demonstrates, especially the descriptions relating to binary options and range accumulation options, educating an investor about options is no easy task. This difficulty is also faced by financial institutions, such as the assignee of the present patent application, as they try to educate their employees concerning options and to determine who, among their employees, may have the skills necessary to make good options transactions.

What is desired, therefore, is an interactive technological system and method that facilitates learning about and trading options by allowing a user to predict performance of a financial vehicle and that also helps a financial institution to objectively determine which employees may have the skills necessary to make good options transactions.

SUMMARY OF THE INVENTION

The objects of the invention are achieved by methods and system for allowing a user, through a computer in telecommunication link with a system having access to financial and market data, to predict the performance of a financial vehicle and thereby provide training for trading options or evaluating predictions. One method includes providing a user interface, via the computer, which allows the user to specify a financial vehicle; displaying, via the user interface, historical performance data for the financial vehicle specified by the user; displaying, via the user interface, projected performance data for the financial vehicle; receiving from the user, via the user interface, performance prediction for the financial vehicle for a time period; receiving from the user, via the user interface, amount of money to leverage relating to the performance prediction for the financial vehicle for the time period; storing the performance prediction for the financial vehicle and the amount of money leveraged; calculating payoff amount based on the performance prediction for the financial vehicle and the amount of money leveraged; and displaying, via the user interface, the calculated payoff amount.

DETAILED DESCRIPTION OF THE PREFERRED EMBODIMENT

Figure 1:
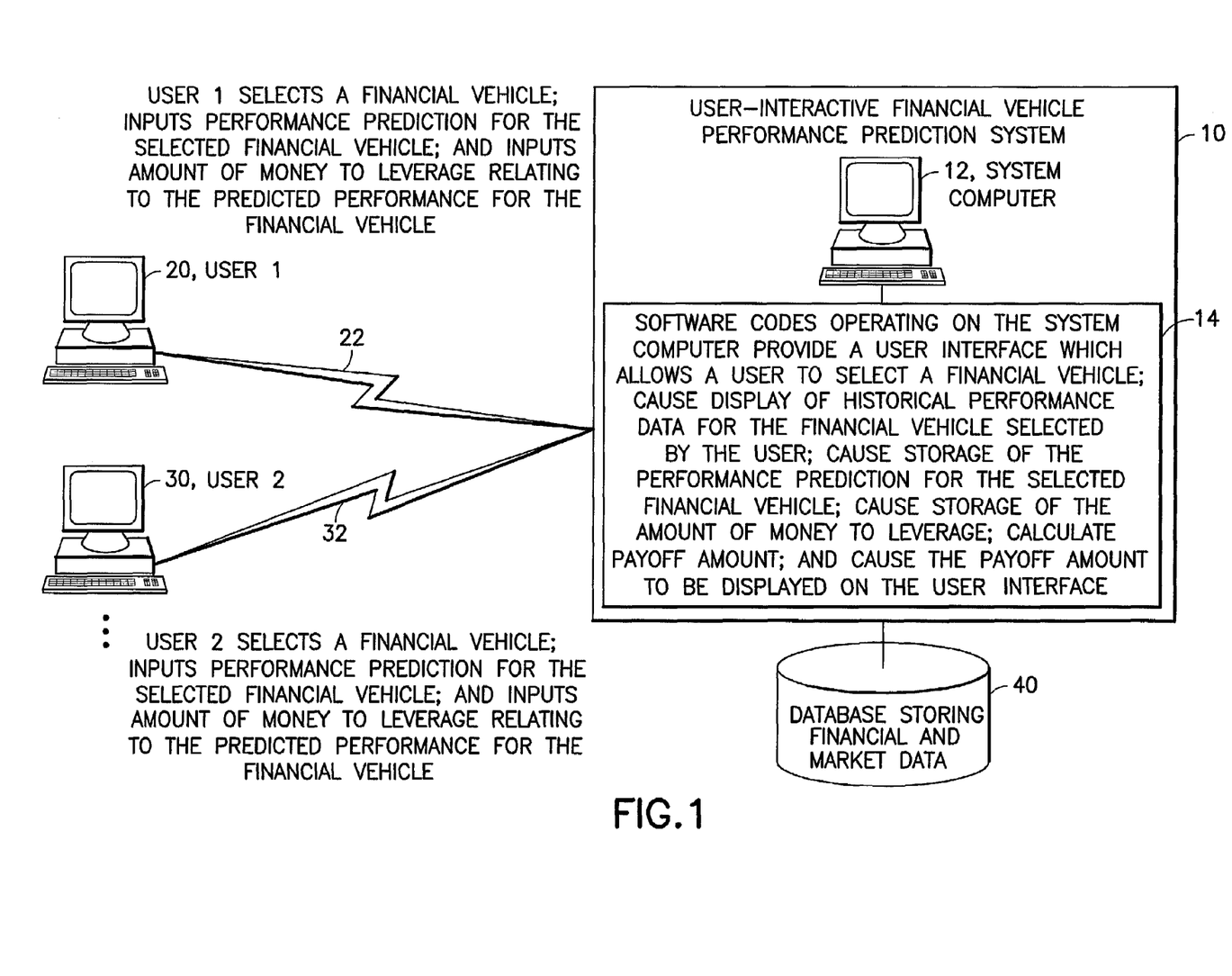
FIG. 1 shows an embodiment of a user-interactive financial vehicle performance prediction system of the present invention.

FIG. 1 shows an embodiment of a user-interactive financial vehicle performance prediction system 10 of the present invention. The system 10 is in telecommunication link 22 with a first user computer 20 and in telecommunication link 32 with a second user computer 30. The telecommunication links 22, 32 may be over a local area network ("LAN") or an Internet connection using a public switched telephone network or a cable network. Connections may also be provided by dedicated data lines, cellular, Personal Communication Systems ("PCS"), microwave, satellite networks, or other data transmission means known in the art. While FIG. 1 shows the first and second user computers 20, 30 separately linked to the system 10, it should be apparent to one of ordinary skill in the art that if the first and second user computers are part of the same LAN or the like, then both user computers can be linked to the system 10 by a common telecommunication link. It should also be apparent to one of ordinary skill in the art that while FIG. 1 shows two user computers linked to the system 10 of the present invention, the system is designed to work with one or more user computers.

The user-interactive financial vehicle performance prediction system 10 includes a system computer 12. A storage unit, such as a database 40, which stores financial and market data is electronically connected to the system 10. As will be described in greater detail below, software codes 14 executing on a microprocessor (not shown) of the system computer 12 provide a user interface to the user computers 20, 30 through which users can select a financial vehicle. As used herein, the term "financial vehicle" includes, but is not limited to, stocks, foreign exchange rates, interest rates, market indices, government obligation rates, and corporate bond rates. Providing a user interface to a user computer, which user interface has choices of financial vehicles for selection by a user is shown at step 100 of FIG. 2.

Figure 2:
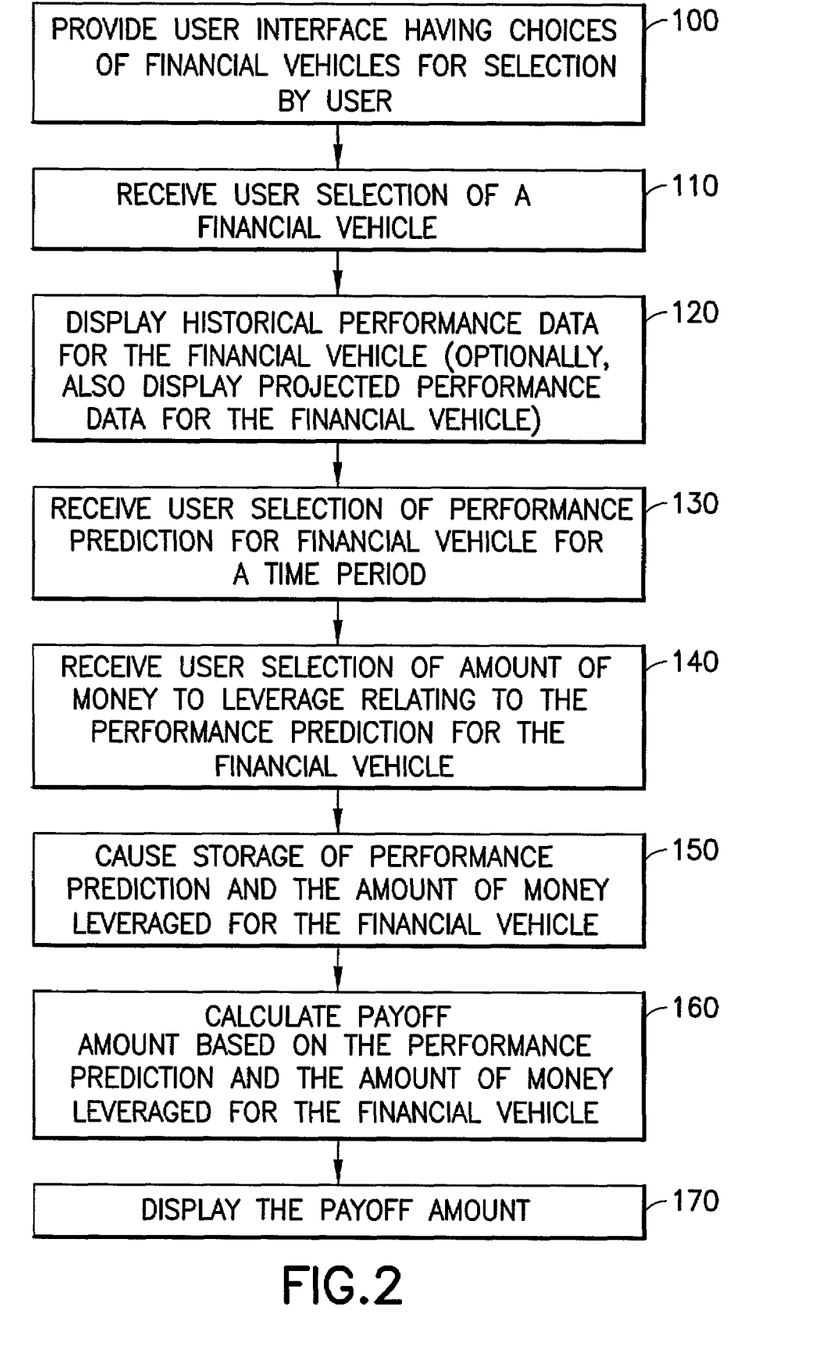
FIG. 2 shows an operation flowchart of the user-interactive financial vehicle performance prediction system of FIG. 1.

FIG. 2 is a flowchart showing the operation of the user-interactive financial vehicle performance prediction system 10 of FIG. 1. At step 110, the system receives user selection of a financial vehicle. For example, the system 10 may receive the selection of the Dow Jones Industrial Average ("DJIA") index as the financial vehicle from user 1's computer 20 over the telecommunication link 22. At step 120, the system causes to be displayed on the user interface historical performance data for the financial vehicle. The time period spanning the historical performance data is preferably user selectable via the user interface. For example, after selecting the DJIA as the financial vehicle, user 1 may select to view the performance of the DJIA over the last 12 months.

At step 130, the system receives user selection of performance prediction for the financial vehicle for a time period. Preferably, the time period for the performance prediction is user selectable via the user interface. Also, the performance prediction for the financial vehicle may be a range of values, rather than one value. Using the example above, the system 10 may receive from user 1's computer 20 the prediction that on the third Friday of July, 2001, the DJIA will be in the range of 10900 and 11000. By contrast, the system 10 may receive from user 2's computer 30 the prediction that at the end of December, 2001, the DJIA will be trading at 11300.

At step 140, the system receives user selection of amount of money to leverage relating to the performance prediction for the financial vehicle. Returning to the DJIA example above, user 1 may choose to invest $1000 for his prediction that on the third Friday of July, 2001, the DJIA will be in the range of 10900 and 11000. Both the performance prediction and the amount of money leveraged for the financial vehicle received from the user is caused to be stored by the system. This is shown as step 150. At step 160, the system calculates a payoff amount based on the performance prediction and the amount of money leveraged for the financial vehicle. For the DJIA example used above, the system 10 may review the options contracts expiring in July, 2001 to set a payoff amount for user 1's $1000 "bet" that the DJIA will end in the range of 10900 and 11000 on the third Friday of July, 2001. This calculated payoff amount is displayed on the user interface at step 170.

While FIG. 2 shows a user predicting the performance of a financial vehicle for a time period, it should be apparent to one of ordinary skill in the art that the same user may predict the performance of a financial vehicle for a plurality of time periods. Also, it should be apparent to one of ordinary skill in the art that the same user may predict the performance of a plurality of financial vehicles.

Figure 3:
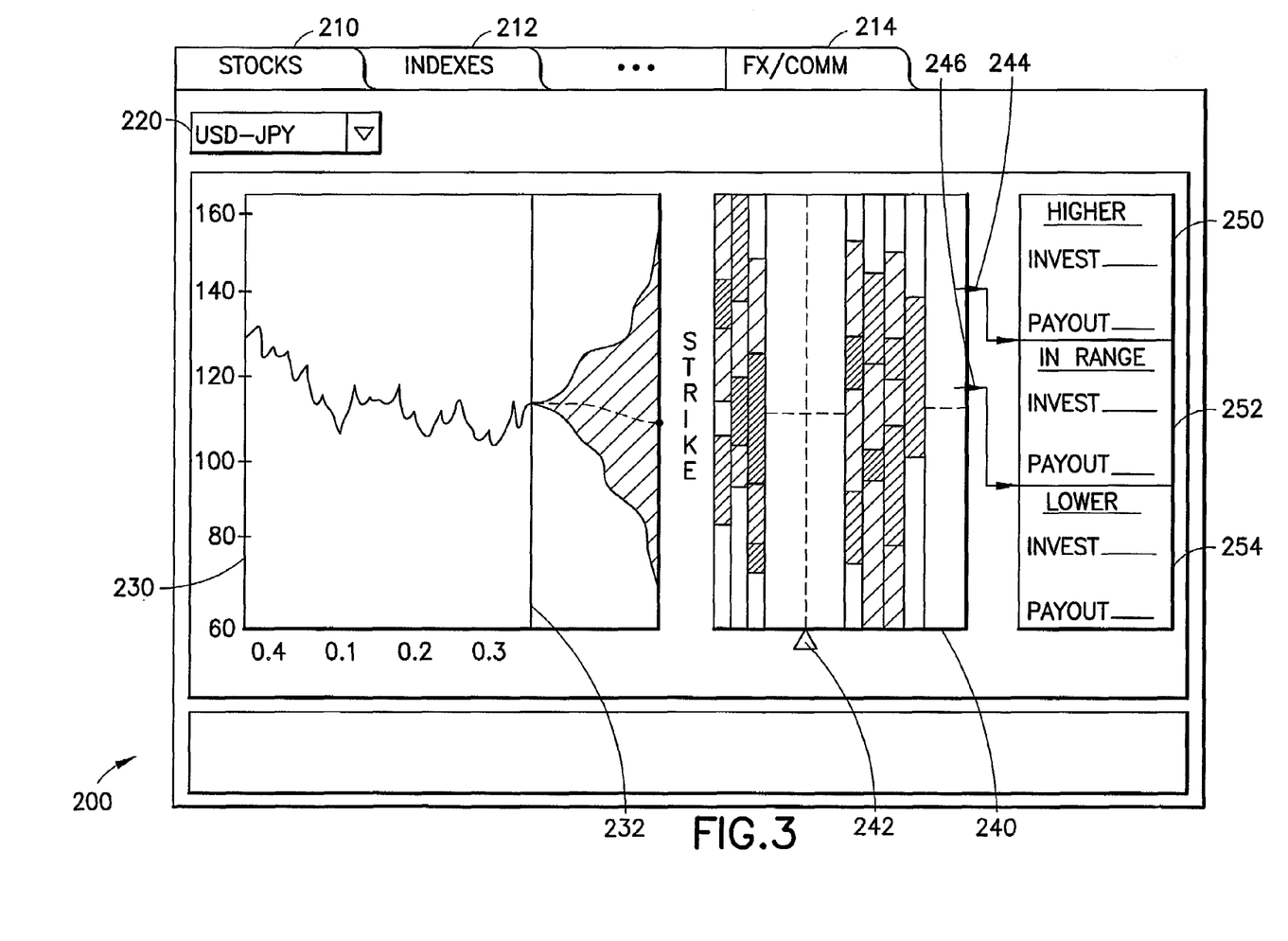
FIG. 3 shows an embodiment of a user interface provided by the system of FIG. 1.

Referring to FIG. 3, there is shown one embodiment of the user interface provided by the user-interactive financial vehicle performance prediction system 10 of FIG. 1. The user interface 200 has selectable tabs 210, 212, 214, with each tab corresponding to a category of a financial vehicle. In the embodiment of FIG. 3, tab 210 corresponds to stocks, tab 212 corresponds to market indexes, and tab 214 corresponds to foreign exchange rates/commodities. While FIG. 3 shows three such tabs, it should be apparent to one of ordinary skill in the art that additional tabs corresponding to other categories of financial vehicles may also be included in the user interface 200. Also, the user interface may only have one tab is so desired, without departing from the scope or objects of the present invention.

A pull-down interactive element 220 is shown in FIG. 3. In the exemplary embodiment, this pull-down interactive element 220 allows the user to select a specific financial vehicle from the selected category of financial vehicles. FIG. 3 shows as an example the selection by the user of the foreign exchange/commodities tab 214, and within this category of financial vehicles, the selection of the exchange rate of Japanese yen to the United States dollar. It should be apparent to one of ordinary skill in the art that while the embodiment of FIG. 3 shows the use of tabs and pull-down interactive element, other ways for a user to select a specific financial vehicle can be utilized without departing from the scope or objects of the invention.

The user interface 200 also includes a first window 230 which displays historical performance data for the financial vehicle selected by the user, as well as projected performance data for the financial vehicle. The vertical axis of the first window shows the values for the selected financial vehicle. The horizontal axis of the first window serves as the time line. There is shown a line separator 232 within the first window 230, which separates the historical performance data (left of the line 232) from the projected performance data (right of the line 232). In the Japanese yen-U.S. dollar exchange rate example shown in FIG. 3, the preceding one-year historical performance data is shown. Note that the time period spanning the historical performance data may be user selected.

The projected performance data for the financial vehicle is displayed as a distribution curve in the user interface 200. This distribution curve may be derived from, for example, call and put options contracts for the financial vehicle, projections of members of the financial community studying the financial vehicle, mathematical formulation based on the historical performance of the financial vehicle, etc. Note that the time period of display for the projected performance data may be user selected.

A second window 240 of the user interface displays the components making up the distribution curve of the projected performance data for the financial vehicle. A first user selectable element, shown as a sliding arrow 242 in FIG. 3, allows the user to select a time period of a performance prediction for the financial vehicle. A second user selectable element, shown as a sliding arrow 244, allows the user to select an upper range value of the performance prediction for the time period. A third user selectable element, shown as a sliding arrow 246, allows the user to select a lower range value of the performance prediction for the time period. Note that in the embodiment of FIG. 3, the user can specify a value, rather than a range, by selecting the same value with the second and third user selectable elements 244, 246.

Three boxes 250, 252, 254 are shown in the user interface 200. Box 250 allows the user to invest a user selectable amount of money for performance prediction values of the financial vehicle above the upper range value selected by the user with the sliding arrow 244. Box 252 allows the user to invest a user selectable amount of money for performance prediction values of the financial vehicle within the upper and lower range values selected by the user with the sliding arrows 244, 246. Box 254 allows the user to invest a user selectable amount of money for performance prediction values of the financial vehicle below the lower range value selected by the user with the sliding arrow 246.

After the user has specified the amount of money to allocate for the performance prediction, the software codes 14 of the system 10 (see FIG. 1) calculate payoff amount. After the payoff amount is calculated, it is shown in the appropriate box 250, 252, 254.

Those skilled in the art will recognize that the methods and system of the present invention are not limited to the representative examples disclosed herein. Moreover, the scope of the present invention covers conventionally known variations and modifications to the methods and system components described herein, as would be known by those skilled in the art.

What is claimed is:

1. A method for allowing a user, through a computer in telecommunication link with a system having access to financial and market data, to predict the performance of a financial vehicle and thereby provide training for trading options or evaluating predictions, which comprises:
   providing a user interface, via the computer, which allows the user to specify a financial vehicle;
   displaying, via the user interface, historical performance data for the financial vehicle specified by the user;
   displaying, via the user interface, projected performance data for the financial vehicle;
   receiving from the user, via the user interface, performance prediction for the financial vehicle for a time period;
   receiving from the user, via the user interface, amount of money to leverage relating to the performance prediction for the financial vehicle for the time period;
   storing the performance prediction for the financial vehicle and the amount of money leveraged;
   calculating payoff amount based on the performance prediction for the financial vehicle and the amount of money leveraged; and
   displaying, via the user interface, the calculated payoff amount.

2. The method of claim 1, wherein the time period of the performance prediction for the financial vehicle received from the user is user selectable via the user interface.

3. The method of claim 1, wherein the financial vehicle is a stock.

4. The method of claim 1, wherein the financial vehicle is a foreign exchange rate.

5. The method of claim 1, wherein the financial vehicle is an interest rate.

6. The method of claim 1, wherein the financial vehicle is a market index.

7. The method of claim 1, wherein the financial vehicle is a government obligation rate.

8. The method of claim 1, wherein the financial vehicle is a corporate bond rate.

9. The method of claim 1, wherein the historical performance data for the financial vehicle is displayed for a time period selectable by the user via the user interface.

10. The method of claim 1, wherein the projected performance data for the financial vehicle is displayed as a distribution curve.

11. The method of claim 1, wherein the projected performance data for the financial vehicle is displayed for a time period selectable by the user via the user interface.

12. The method of claim 1, wherein the projected performance data for the financial vehicle is based on call and put options contracts for the financial vehicle.

13. The method of claim 1, wherein the projected performance data for the financial vehicle is based on statistical analyses of the historical performance data for the financial vehicle.

14. The method of claim 1, wherein the projected performance data for the financial vehicle is based on projections of members of the financial community studying the financial vehicle.

15. The method of claim 1, wherein the performance prediction for the financial vehicle received from the user comprises a range of values.

16. In a system having access to financial and market data, the system being in telecommunication link with at least one user computer, a method for allowing a user of a user computer to predict the performance of a financial vehicle and thereby provide training for trading options and evaluating predictions, which comprises:
   providing a user interface, via the user computer, having a first user selectable element and a second user selectable element;
   receiving from the user, via the user interface, selection of a financial vehicle;
   displaying, via the user interface, historical performance data for the financial vehicle selected by the user;
   allowing the user, via the first user selectable element, to specify a time period for predicting the performance of the financial vehicle;
   allowing a user, via the second user selectable element, to specify performance prediction of the financial vehicle for the time period;
   receiving from the user, via the user interface, amount of money to leverage relating to the performance prediction of the financial vehicle for the time period;
   causing storage of the performance prediction for the financial vehicle and the amount of money leveraged;
   calculating payoff amount based on the performance prediction for the financial vehicle and the amount of money leveraged; and
   displaying, via the user interface, the calculated payoff amount.

17. The method of claim 16, wherein the financial vehicle is a stock.

18. The method of claim 16, wherein the financial vehicle is a foreign exchange rate.

19. The method of claim 16, wherein the financial vehicle is a market index.

20. The method of claim 16, wherein the financial vehicle is a government obligation rate.

21. The method of claim 16, wherein the historical performance data for the financial vehicle is displayed form a time period selectable by the user via the user interface.

22. The method of claim 16, which further comprises displaying, via the user interface, projected performance data for the financial vehicle.

23. The method of claim 22, wherein the projected performance data for the financial vehicle is displayed as a distribution curve.

24. The method of claim 22, wherein the projected performance data for the financial vehicle is displayed for a time period selectable by the user via the user interface.

25. The method of claim 22, wherein the projected performance data for the financial vehicle is based on call and put options contracts for the financial vehicle.

26. The method of claim 22, wherein the projected performance data for the financial vehicle is based on statistical analyses of the historical performance data for the financial vehicle.

27. The method of claim 22, wherein the projected performance data for the financial vehicle is based on projections of members of the financial community studying the financial vehicle.

28. The method of claim 16, wherein the performance prediction for the financial vehicle specified by the user comprises a range of values.

29. A user-interactive system for allowing a user, through a computer in telecommunication link with the system, to predict the performance of a financial vehicle and thereby provide training for trading options or evaluating predictions, the system having electronic access to financial and market data and comprising:
 a system computer having a microprocessor, the system computer providing a user interface to the user computer through which the user can specify a financial vehicle;
 a first set of software codes executing on the microprocessor, the first set of software codes causing the user interface to display historical performance data for the financial vehicle specified by the user;
 a second set of software codes executing on the microprocessor, the second set of software codes causing storage of performance prediction for the financial vehicle received from the user via the user interface;
 the second set of software codes also causing storage of amount of money to leverage received from the user via the user interface, the amount of money to leverage relating to the performance prediction for the financial vehicle; and
 a third set of software codes executing on the microprocessor, the third set of software codes calculating payoff amount based on the performance prediction for the financial vehicle and the amount of money leveraged, and displaying the payoff amount on the user interface.

30. The system of claim 29, wherein the first set of software codes and the second set of software codes are part of the same set of software codes.

31. The system of claim 29, wherein the second set of software codes and the third set of software codes are part of the same set of software codes.

32. The system of claim 29, wherein the first, second and third sets of software codes are part of the same set of software codes.

33. The system of claim 29, wherein the first set of software codes also causes the user interface to display projected performance data for the financial vehicle.

\* \* \* \* \*